United States Patent [19]

Freeling et al.

[11] 4,145,691
[45] Mar. 20, 1979

[54] RF BURST SIGNAL RECIRCULATION MEMORY SYSTEM HAVING A DIPLEXED FEEDBACK LOOP

[75] Inventors: Marvin R. Freeling, Montclair; Herbert J. Wolkstein, Livingston, both of N.J.

[73] Assignee: RCA Corporation, New York, N.Y.

[21] Appl. No.: 883,819

[22] Filed: Mar. 6, 1978

Related U.S. Application Data

[63] Continuation of Ser. No. 207,459, Dec. 13, 1971, abandoned.

[51] Int. Cl.² ............................ G01S 7/38; G01S 9/02; H04K 3/00
[52] U.S. Cl. ................................. 343/7 AG; 343/7 A; 343/18 E
[58] Field of Search ................... 343/7 A, 18 E, 7 AG

[56] References Cited

U.S. PATENT DOCUMENTS

| | | | |
|---|---|---|---|
| 3,113,268 | 12/1963 | Horak | 343/18 E |
| 3,187,258 | 6/1965 | Zolnik | 343/18 E |
| 3,225,300 | 12/1965 | Barney et al. | 343/18 E |
| 3,689,922 | 9/1972 | Phillips, Jr. | 343/18 E X |

Primary Examiner—Malcolm F. Hubler
Attorney, Agent, or Firm—H. Christoffersen; R. Troike; J. D. Lazar

[57] ABSTRACT

A radio frequency burst signal memory system is described which includes a feedback loop for recirculation of the received RF burst signal when a proper burst signal is detected. The output from an RF amplifier is split into separate frequency bands by a diplexer. When one of these bands is sensed at the input, only signals of the sensed frequency band are recirculated.

8 Claims, 2 Drawing Figures

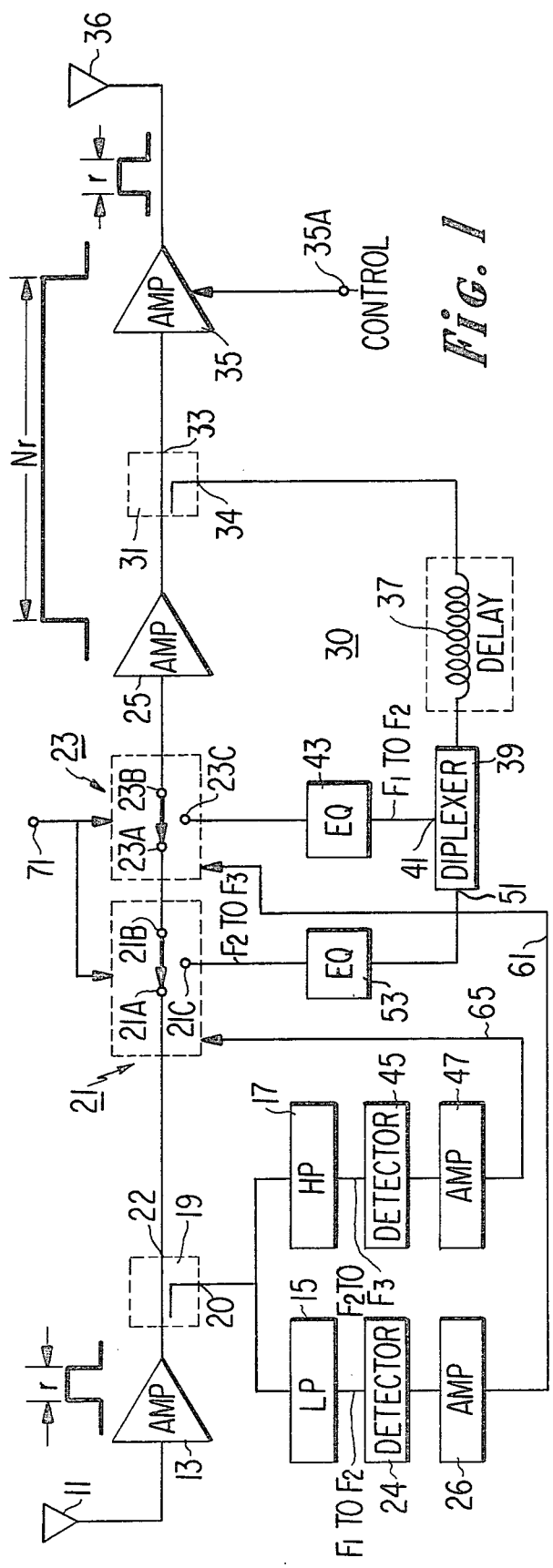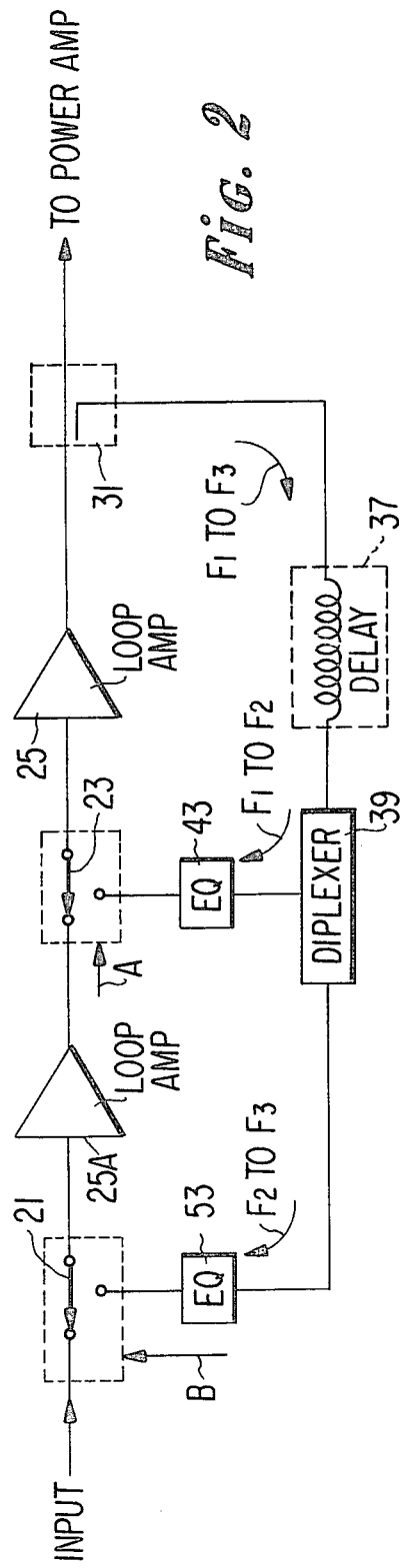

RF BURST SIGNAL RECIRCULATION MEMORY SYSTEM HAVING A DIPLEXED FEEDBACK LOOP

This is a continuation of application Ser. No. 207,459, filed Dec. 13, 1971, now abandoned.

This invention relates to an RF (radio frequency) burst signal memory storage system and more particularly to the type which includes a feedback loop for recirculation of a received RF burst signal when a proper RF burst signal is detected.

The term RF burst signal refers to a burst of RF energy such as that emitted by a typical radar system toward a target by the pulsing of a radio frequency wave. This RF burst memory storage system finds particular use in electronic countermeasure (ECM) systems for radar applications. In such ECM systems, the radio frequency memory storage system must respond to a wide band of unfriendly radar signals over extremes in operating environment. The systems must operate effectively over wide ranges of frequencies, signal strengths and RF burst widths. The role of an RF burst memory storage system is to enable recirculation and preservation of the received RF burst signal when the memory system is activated. This activation is achieved by means of a threshold detector located near the input of the ECM system and by a logic circuit such that, when a proper pulse is detected at the input, the feedback loop is switched on. A more detailed description and operation of an ECM system is given in Microwaves, November 1969, Vol. 8, No. 11, pages 73 thru 79 entitled "The Loop TWT, Key to Range Deception" by H. J. Wolkstein, M. Freeling and M. P. Puri.

Achieving octave memory performance at microwave frequencies, imposes an extremely difficult task. For good RF memory recirculation of the RF burst signal, the loop amplifier stage must have several characteristics as follows:

(1) The small signal gain of the amplifier must track and offset the loss of the feedback components.

(2) The excess gain (for best operation) should be a rising function in frequency.

(3) The feedback amplifier must have good overdrive capability at the equilibrium point, namely, where the small signal gain equals the feedback loss.

(4) Recirculating wide band noise must be suppressed at frequencies other than the coherent frequency to eliminate noise capture of the feedback system. This would cause the use of a false burst signal.

(5) A low-pass filter must be used to eliminate second harmonic capture.

In general, the problems with noise and/or harmonic capture and improper gain equilization makes broad band memory storage difficult to obtain, and the systems are generally restricted for good operation to bandwidths of just less than an octave bandwidth.

In the present invention, the RF burst signal in the loop is split into separate frequency bands. By sensing at the inputs to the RF memory, to which frequency band the input RF burst signal belongs, the loop then is switched so as to only recirculate burst signals within the sensed frequency band.

A further description of the subject invention follows in conjunction with the following drawing wherein:

FIG. 1 is a block diagram of a diplexed RF memory feedback system.

FIG. 2 is a diplexed RF memory feedback loop which provides for more gain at the higher band of frequencies.

Referring to FIG. 1, the input RF burst signals of width r are coupled at antenna 11 and are applied to an amplifier 13 which amplifier may be, for example, a traveling wave tube (TWT) amplifier. The output of the amplifier 13 is coupled to a directional coupler 19. The output of the directional coupler 19 is coupled at one end 22 to two serially connected single-pole, double-throw switches 21 and 23. The switch 21 is connected so that terminal 21A is normally connected to terminal 21B. Switch 23 is arranged so that terminal 23A is normally connected to terminal 23B. Terminal 23B is coupled to amplifier 25, and terminal 23A is coupled to terminal 21B. Consequently, amplifier 25 is normally connected to the output terminal 22 of directional coupler 19.

The amplifier 25 is coupled to a second directional coupler 31. The directional coupler 31 has a pair of output terminals 33 and 34. The output terminal 33 is coupled to a gated power amplifier 35 and to an output transmitting antenna 36. The amplifiers 25 and 35 may also be TWT amplifiers. The amplifier 35 may be gated on after a certain time delay and for a selected time period. This gating on of amplifier 35 may be provided by a control pulse coupled through terminal 35A to amplifier 35. This gating provides at the output of the system over antenna 36 a deceptive pulse of width r to the radar with a certain time delay.

Directional coupler 31 is part of a recirculation loop 30. A portion of the output at the coupler 31 is coupled via terminal 34 to delay line 37. The recirculation loop 30 includes directional coupler 31, delay line 37, diplexer 39, one of two equalizers 43 or 53, one or both switches 21 or 23 and amplifier 25. The delay line 37 may be, for example, a coaxial cable delay line wherein the length of the cable provides a delay so that one recirculation period of the loop 30 is roughly equivalent to the duration r of the radar burst signal. The output from the delay line 37 in the loop 30 is coupled to a diplexer 39. The diplexer 39 separates the RF burst signals and couples the RF burst signals within a frequency range $f_1$ to $f_2$ out of terminal arm 41 to equalizer 43 and RF burst signals within a frequency range $f_2$ to $f_3$ out of terminal arm 51 to equalizer 53. The output from equalizer 43 is coupled to a terminal 23C of single-pole, double-throw switch 23. The output of equalizer 53 is coupled to terminal 21C of single-pole, double-throw RF switch 21. The equalizers 43 and 53 are attenuation equalizers. The equalizer 43 is inserted to provide the proper excess gain in the feedback loop comprised of amplifier 25, delay line 37, diplexer arm 41, equalizer 43 and RF switch 23C as a function of frequencies within the $f_1$ to $f_2$ frequency range. Equalizer 53 is inserted to provide the proper excess gain in the feedback loop comprised of delay line 37, diplexer arm 51, equalizer 53 and RF switch 21C as a function of frequencies in the $f_2$ to $f_3$ frequency range.

At the input directional coupler 19, a portion of each RF burst signal is coupled via terminal 20 to low-pass filter 15 and high-pass filter 17. The low-pass filter 15 is designed to pass signals in the $f_1$ to $f_2$ frequency range. A threshold detector 24 is coupled to the output of filter 15 and, in the presence of an RF burst signal in the $f_1$ to $f_2$ frequency range at the output of filter 15, a detected switching signal is applied from detector 24 to amplifier 26. The amplified switching signal at amplifier 26 is coupled over lead 61 to single-pole, double-throw RF switch 23. The RF switch 23 in response to the amplified switching signal output from detector 24 places the RF switch 23 in a position so as to couple signals only between terminals 23C and 23B.

The high-pass filter 17 passes only those signals within the $f_2$ to $f_3$ frequency range to threshold detector 45. The output from detector 45 provides a switching signal to amplifier 47. The amplified switching signal from detector 45 is applied to single-pole, double-throw RF switch 21. The single-pole, double-throw RF switch 21 in response to the switching signal from detector 45 changes state so as to provide coupling only of signals between terminals 21B and 21C.

In the operation of the memory system described above, the input RF burst signal received from an illuminating radar, for example, is picked up by antenna 11 and applied to amplifier 13. A portion of the amplified signals from amplifier 13 is coupled through directional coupler 19 to low-pass filter 15 and high-pass filter 17. The other portion of the received RF burst signal is coupled through terminals 21A and 21B of RF switch 21 and through terminals 23A and 23B of RF switch 23 to amplifier 25. The amplified output from amplifier 25 is coupled through the directional coupler 31 to gated amplifier 35.

A portion of the signal at directional coupler 31 is coupled to the feedback loop 30 with the output from coupler 31 coupled to delay line 37 and to diplexer 39. If the signals in the loop 30 are in the $f_1$ to $f_2$ frequency range, the signal at the diplexer 39 is coupled out of terminal arm 41 to equalizer 43 and from equalizer 43 to terminal 23C of RF switch 23. If the signals are in the $f_2$ to $f_3$ frequency range, the output from the diplexer 39 is via the terminal arm 51 to equalizer 53 and from the output of equalizer 53 to terminal 21C of RF switch 21. If the RF burst signal at the coupler 19 is in the $f_1$ to $f_2$ frequency range, the coupled signal is passed through the low-pass filter 15 and is applied to threshold detector 24. If the signal is above a given threshold i.e., that which would indicate an enemy radar, the signal is detected and a switching signal is coupled out of detector 24 to amplifier 26. The amplified switching signal from amplifier 26 is applied over lead 61 to RF switch 23. The RF switch 23 in response to the control signal from detector 24, changes state so as to only couple the signals at terminal 23C to terminal 23B. The received RF burst signal at $f_1$ to $f_2$ frequency range is thereby recirculated a given N times that of the originally received pulse by circulating that burst signal through the feedback loop 30 of amplifier 25, directional coupler 31, delay line 37, diplexer 39, equalizer 43 and RF switch 23. The width of the recirculated pulse is therefore $N_r$. When it is desired to stop recirculating the burst signal, a control signal from an outside logic source may be coupled to terminal 71 and applied to switch 23 to set the switch 23 back again to couple only signals between terminals 23A and 23B.

If, on the other hand, the RF burst signal coupled at directional coupler 19 is in the $f_2$ to $f_3$ frequency band, the signal is coupled out of high-pass filter 17 to threshold detector 45. If the RF burst signal is above a given amplitude, a switching signal is provided at the output of detector 45. This switching signal is amplified by amplifier 47 and applied over lead 65 to RF switch 21. RF switch 21 in response to a switching signal from detector 45 changes state to couple signals between terminal 21C and terminal 21B. In this manner, the RF burst signal within the $f_2$ to $f_3$ frequency range is recirculated the given N times through the loop 30 made up of RF switch 23 (between terminals 23A and 23B), amplifier 25, directional coupler 31, delay line 37, diplexer 39, equalizer 53 and between terminals 21C and 21B of switch 21. The recirculated burst signal N times the received signal burst width r is then coupled out of directional coupler 31 to the gated amplifier 35 to antenna 36. When it is desired to stop recirculating the RF burst signal, a control signal is coupled through terminal 71 to switch 21 to return that switch to its normal position to couple signals between terminals 21A and terminal 21B.

Splitting the frequency bands in the manner described above makes it easier to match the amplifier and feedback loss characteristics and to equalize the excess gain. In addition, each loop can eliminate its own second harmonic and reduce the problems of noise capture.

A variation of the arrangement shown in FIG. 1 is that shown in FIG. 2. In FIG. 2, RF burst signals in the lower frequency range of from $f_1$ to $f_2$ are coupled through the loop consisting of amplifier 25, directional coupler 31, delay line 37, diplexer 39, equalizer 43 and RF switch 23. RF burst signals within the higher frequency bands of from $f_2$ to $f_3$ are coupled through two amplifier stages 25 and 25A, RF switch 23, directional coupler 31, delay line 37, diplexer 39, equalizer 53 and switch 21. The arrangement of FIG. 2, therefore, provides more gain for the higher band of frequencies $f_2$ to $f_3$. This will enable the total gain to offset higher frequency losses in that segment of the frequency band. Control to the switches 21 and 23 to switch to the two recirculation conditions is provided by the outputs from the detectors 24 and 45 in FIG. 1.

What is claimed is:

1. A storage system for recirculating substantially all of received radio frequency burst signals where the expected frequency of said received signals may vary over a relatively wide range of frequencies, comprising:

a first recirculation loop including an amplifier, a delay line, a diplexer and a pair of switches, said pair of switches being normally connected in series with the output of the first switch connected to the input of the second switch, a second recirculation loop including said amplifier, said delay line, said diplexer and only said second switch, said first and second loops being of a fixed electrical length, said diplexer having an input arm and a pair of output arms, said diplexer being responsive to said burst signals at the input arm for providing at a first output arm only signals within a first frequency band of said wide range of frequencies and at a second output arm only signals within a second higher frequency band of said wide range of frequencies, means including a first equalizer for coupling the output from said second arm of said diplexer to the first switch of said pair of switches, said first equalizer being arranged to achieve equalization of the gain of said amplifier over said higher frequency band, means including a second equalizer for coupling the ouput from said first arm to the second of said pair of switches, said second equalizer being arranged to achieve equalization of the gain of said amplifier over said first frequency band, input means for coupling said burst signals to the first of said pair of switches, said switches being in a first state to couple said input burst signals out of said system without recirculating said signals via said loops, means including a frequency sensing means located remote from said loops coupled between said input means and said first switch and responsive to signals within said second frequency band for causing said first switch when said input burst signal is within said second frequency band to change state and provide recirculation of said signals within said second higher frequency band in said first recirculation loop, means including a frequency sensing means located remote from said loops coupled between said input means and said second switch and responsive to signals within said first frequency band for causing said second switch when said input signals are within said first frequency band to change state and provide recirculation of said signals within said first frequency band in said second recirculation loop.

2. The combination claimed in claim 1 wherein between said first and second switch is provided an amplifier for providing additional amplification of recirculating signals within said second frequency band.

3. The combination claimed in claim 1 wherein each of said means for causing the switches to change state includes a frequency filter and a threshold detector.

4. A storage system for recirculating substantially all of received radio frequency burst signals where the expected frequency of said signals may vary over a relatively wide range of frequencies comprising:

a first recirculation loop including an amplifier, a delay line, a diplexer and a first equalizer, a second recirculation loop including said amplifier, said delay line, said diplexer, and a second equalizer, said first and second recirculation loops being of a fixed electrical length, said diplexer having an input arm and at least two ouput arms, with a first output arm coupled in said first loop and the second output arm coupled in said second loop, said diplexer responsive to said burst signals at said input arm for providing at said first output arm only signals within a first frequency band of said wide range of frequencies and at said second output arm only signals within a second higher frequency band of said wide range of frequencies, said first equalizer being arranged to achieve equalization of said amplifier gain over said first frequency band and said second equalizer being arranged to achieve equalization of said amplifier gain over said second higher frequency band, switching means coupled in said recirculation loops between said first and second output arm of said diplexer and said amplifier for recirculating signals through only a selected one of said two recirculation loops, input means for coupling said burst signals to said recirculation loops, frequency sensing means coupled to said input means for sensing the one of said two frequency bands associated with said input burst signals, said switching means being coupled to said sensing means and responsive to the sensed one of said two frequency bands for recirculating said burst signals through the one of said two recirculation loops passing the sensed frequency band.

5. A system for recirculating received radio frequency burst signals where the expected frequency of said signals may vary over a relatively wide range of frequencies comprising:

a first recirculation feedback loop including an amplifier, a delay line, and a diplexer, a second recirculation feedback loop including said amplifier, said delay line, and said diplexer, said first and second recirculation feedback loops being of a fixed electrical length, equalization means in at least one of said recirculation feedback loops to equalize excess gain that may exist in said one recirculation loop, said diplexer having an input arm and at least two output arms, with a first output arm coupled in said first loop and the second output arm coupled in said second loop, said diplexer responsive to said burst signals at said input arm for providing at said first output arm only signals within a first frequency band of said wide range of frequencies and at said second output arm only signals within a second higher frequency band of said wide range of frequencies, said equalization means thereby equalizing said amplifier gain over at least one of said first and second frequency bands, switching means coupled in said recirculation feedback loops between said first and second output arm of said diplexer and said amplifier for recirculating signals through only a selected one of said two recirculation feedback loops, input means for coupling said burst signals to said recirculation feedback loops, frequency sensing means coupled to said input means for sensing the one of said two frequency bands associated with said input burst signal, said switching means being coupled to said sensing means and responsive to the sensed one of said two frequency bands for recirculating said burst signals through the one of said two recirculation feedback loops passing the sensed frequency band.

6. A system for recirculating received radio frequency burst signals where the expected frequency of said signals may vary over a relatively wide range of frequencies and said received signals have a predetermined duration comprising:

a recirculation loop including an amplifier, a delay line and a diplexer, the electrical length of said recirculation loop being fixed such that said loop has a fixed recirculation period substantially equal to the predetermined duration of said received signals, said diplexer having an input arm and a pair of output arms, said diplexer responsive to said burst signals at said input arm for providing at a first output arm only signals within a first frequency band of said wide range of frequencies and at a second output arm only signals within a second higher frequency band of said wide range of frequencies, switching means coupled in said recirculation loop between said first and second output arm of said diplexer and said amplifier for recirculating signals at only a selected one of said two frequency bands through said loop, input means for coupling said burst signals to said recirculation loop, means coupled to said input means for sensing signals within one of said two frequency bands associated with said input burst signals, said switching means being coupled to said sensing means and responsive to said sensed signals of said two frequency bands for recirculating the burst signals of said one of said two frequency bands through said recirculation loop and decoupling said loop from said input means whereby said burst signals are recirculated in said loop independent of said received burst signals.

7. A system according to claim 6 wherein said recirculation loop includes equalization means for equalizing the gain of said amplifier.

8. A system according to claim 6 wherein each of said frequency bands of said diplexer is less than an octave in bandwidth, whereby recirculation of signals through each of said diplexer arms that are second harmonics of the frequencies of said received burst signals are eliminated.

* * * * *